United States Patent [19]

Anderson

[11] Patent Number: 5,254,047
[45] Date of Patent: Oct. 19, 1993

[54] CHAIN TAKE-UP APPARATUS
[75] Inventor: Roger C. Anderson, Franklin, Pa.
[73] Assignee: Joy Technologies Inc., Pittsburgh, Pa.
[21] Appl. No.: 790,941
[22] Filed: Nov. 12, 1991
[51] Int. Cl.$^5$ .............................................. F16H 7/14
[52] U.S. Cl. ................................... 474/110; 474/136; 474/150; 474/901
[58] Field of Search ............... 474/101, 110, 136, 150, 474/901; 198/816, 826; 305/10, 22

[56] References Cited
U.S. PATENT DOCUMENTS

| 2,959,451 | 11/1960 | Weber | 305/10 |
| 3,403,552 | 10/1968 | Erisman | 474/110 X |
| 3,409,335 | 11/1968 | Piepho et al. | 305/10 |
| 3,413,865 | 12/1968 | Nimtz et al. | 474/110 X |
| 3,980,351 | 9/1976 | Orr et al. | 305/10 |
| 4,300,890 | 11/1981 | Hallmann et al. | 474/110 |
| 4,411,638 | 10/1983 | Wilson | 474/110 X |
| 4,650,259 | 3/1987 | Alexander et al. | 305/10 |

FOREIGN PATENT DOCUMENTS

WO87/02955  5/1987  World Int. Prop. O. .

Primary Examiner—Ramon S. Britts
Assistant Examiner—Roger J. Schoeppel
Attorney, Agent, or Firm—Kirkpatrick & Lockhart

[57] ABSTRACT

An apparatus for adjusting the operable position of a roller means adapted to engage endless driven elements such as chains, belts, and the like. The apparatus includes a sprocket carrying assembly that is operably connected to the chain engaging sprocket. A hollow piston, having one end thereof rigidly attached to the chain driven piece of equipment, is slidably and non-rotatably received within the sprocket carrying assembly. The sprocket carrying assembly has a pressure receiving port and cavity therein that is adapted to receive pressurized grease. Seals are provided between the sprocket carrying assembly and piston to achieve a fluid-tight seal therebetween. The hollow piston has a screw member threadedly received therein that is adapted to be axially advanced into and out of the piston by rotating a shaft that extends through the fixed end of the piston. A locking mechanism is removably fastened to the machinery for selectively restricting the rotation of the shaft member.

8 Claims, 6 Drawing Sheets

CHAIN TAKE-UP APPARATUS

BACKGROUND OF THE INVENTION

1. Field of the Invention

The present invention relates to devices adapted to remove slack in endless driven chains and, in particular, to take-up devices for crawler chains used in the mining industry.

2. Description of the Invention Background

In the materials mining industry, such as in the underground mining of coal and similar materials, chain driven continuous mining machines are utilized to remove the coal or ore from the seam. Most continuous mining machines generally have a crawler portion that uses a driven endless crawler or tram chain to propel the mining machine along the mine floor. In addition, endless crawler chains are also utilized on various types of conveyors and haulage vehicles such as mobile articulated conveyors which are used to transport the mined material from the mining machine to other conveyors located remote from the mine face.

The crawler chains used in the operation of those machines generally have a series of crawler pads attached thereto that are adapted to grip the mine floor and propel the mining machine or conveyor forward. The gripping of the mine floor by the crawler pads and the frequent changes in direction of the mining machine or conveyor can cause a significant amount of tensile stresses to build up in the tram chain links. These stresses tend to cause the individual chain links to become slightly elongated which results in the slackening of the endless tram chain around the attending drive and idler sprockets or rollers. To address this problem, take-up devices have been installed on the crawlers in order to increase the distance between the drive and idler sprockets or rollers in such a manner so as to remove the chain slack.

One prior take-up device is illustrated in FIGS. 1-6. As shown in FIGS. 1 and 2, the prior take-up device 200 generally consists of a piston 220 that is rigidly and non-rotatably affixed to the nose piece 215 of a crawler 212. In this design, the piston 220 is slidably received in a sprocket or roller carrying assembly 250 that is slidably received in a slot 216 located in the crawler nose piece 215.

As illustrated in FIG. 4, the sprocket or roller carrying assembly 250 has a counterbore 270 therein that is adapted to receive piston 220. Sprocket or roller carrying assembly 250 additionally has an aperture 251 extending therethrough perpendicularly to the counterbore 270 that is adapted to rotatably receive an axle 252. Idler sprockets or rollers 256, for supporting the tram chain 258, are removably attached to each end of the axle 252.

As can be seen in FIGS. 3 and 4, a grease passage 273 is provided through the side of the sprocket or roller carrying assembly 250 to permit grease to be pumped under pressure into a grease receiving cavity 274 that is located beneath counterbore 270. A grease seal 271 is provided to keep the grease from escaping between the piston 220 and the sprocket or roller carrying assembly 250 as it is pumped into the grease receiving cavity 274.

To remove slack in the tram chain 258, the sprocket or roller carrying assembly 250 is forced to slide within nose piece 215 by pumping grease under pressure into the grease receiving cavity 274. As the grease enters grease receiving cavity 274, the sprocket or roller carrying assembly 250 is forced to slide along the piston 220 carrying with it the idler sprockets or rollers 256. The grease is pumped into the grease receiving cavity 274 until the idler sprockets or rollers 256 have moved far enough into the tram chain 258 to eliminate the slack therein. Thereafter, pieces of shim stock 280 are positioned along piston 220, as shown in FIG. 2, to fill in the resulting gap or shim cavity 218 between the nose piece 215 and the sprocket or roller carrying assembly 250. Each piece of shim stock 280 is U-shaped and has a bore 282 and an opening 284 therethrough to enable it to slide over piston 220 (see FIG. 5). As most particularly shown in FIG. 2, the shim stock 280 may be provided in various thicknesses so that a number of different pieces of shim stock 280 must be combined to achieve the overall thickness necessary to fill in the gap 218 between the sprocket or roller carrying assembly 250 and nose piece 215. After the desired amount of shim stock 280 has been positioned between nose piece 215 and sprocket or roller carrying assembly 250, the shim stock 280 is held in place by a shim retaining plate 286. As shown in FIGS. 2 and 6, the shim retaining plate 286 has a slot 288 in one end thereof that is adapted to slide over a T-shaped retaining pin 224 located on the top of piston 220. The shim retaining plate 286 is secured in position by a screw 290 that is inserted into an aperture 289 located in the end of the shim retaining plate 286. The screw 290 extends through the aperture 289 and is threadedly received in a threaded bore 292 located in the crawler 212. In an effort to keep the screw 290 from backing out of threaded bore 292 during the operation of the crawler 212, a lock washer 294 is often employed. Other methods of securing the shim retaining plate 286 to the nose piece 215, such as pins and cotter key arrangements, have also been used. To complete the process, the grease is permitted to exit out of the grease receiving cavity 274 through the grease passage 273 by removing the grease pumping source.

In another prior design (not shown), a hydraulic cylinder having a piston slidably disposed therein is operatively positioned between the nose piece of the crawler and the sprocket or roller carrying assembly. As with the design discussed above, the sprocket or roller carrying assembly is slidably received in the nose piece of the crawler. To adjust the position of the idler sprockets or rollers, grease is pumped into the hydraulic cylinder causing the piston to slide out of the cylinder and bear against the sprocket or roller carrying assembly causing it to move further into the endless crawler chain. After the sprocket or roller carrying assembly has been moved to the desired position, the grease is then permitted to exit the cylinder to thereby permit the piston to be manually retracted back into the cylinder. Pieces of shim stock are then positioned between the piston and the back of the sprocket carrying assembly to mechanically retain the sprocket carrying assembly in the desired position.

As discussed above, the prior designs have disadvantages in several respects. In particular, the prior designs utilize shim stock to provide a positive mechanical stop for the sprocket or roller carrying assembly. However, as the crawler pads engage and tram across the mine floor, dirt tends to build up in and around the shim cavity due to its relatively close proximity to the mine floor. This build up of dirt makes it difficult to insert and remove the shim stock and thereby increases the amount of time needed to adjust the sprockets or rollers.

Often times, before additional shim stock can be added, the entire shim cavity must be cleaned.

Another serious problem associated with the prior designs is caused by the vibration and abuse the take-up mechanism experiences as the crawler changes directions and encounters irregularities in the mine floor. More specifically, the shim retaining plate often becomes loose or falls out of position causing the shim stock to fall out of the shim cavity and become lost or damaged. Depending upon the amount of chain slack present, an abrupt loss of the shim stock could cause the chain to track off the sprockets or rollers causing damage to other portions of the mining machine or conveyor.

Yet another inherent problem encountered with the prior designs is that an inventory of shim stock of various thicknesses must be maintained in the mining area so that adjustments may be made to the sprockets or rollers as needed. Often times the mine mechanic must search for a piece of shim stock with the proper thickness before adjustments to the chain sprockets or rollers may be undertaken. Additional problems arise when there is no shim stock available to make the necessary adjustments. Experience has shown that such composite combinations of a number of shims of various thicknesses and sizes are more susceptible to being jarred out of the shim cavity and becoming lost during the mining process. Also, the mechanic may be precluded from making very precise adjustments to the sprockets or rollers because shims of the proper thickness are not available. As such, under the prior design, less than optimum adjustments for chain slack are frequently made because shim stock having the desired thickness is not available when needed.

Thus, there is a need for a take-up device for removing the slack from endless tram chains used on continuous mining machines and conveyors that can easily be precisely adjusted and maintained without the use of shim stock or similar materials.

SUMMARY OF THE INVENTION

In accordance with the present invention, there is provided an improved design for take-up mechanisms used to remove the slack developed in endless tram chains, as well as more customary endless chains and belts used on a variety of articles. Tram chains are used in the mining industry to drive continuous mining machines as well as mobile articulated conveyors and generally consist of a plurality of horizontal first chain links interconnected with a plurality of second vertical chain links to form an endless chain. These links are adapted to engage adjustable drive sprockets or rollers provided on the crawler portion of the mining machine or conveyor.

The take-up mechanism provided includes a sprocket or roller carrying assembly that is operatively connected to an axle having two chain engaging sprockets or rollers affixed thereto. The sprocket or roller carrying assembly is slidably received within a corresponding slot provided in the nose piece of the crawler. A hollow piston, having the one end thereof non-rotatably fastened to the nose piece, is slidably and non-rotatably received within a cavity located in the sprocket or roller carrying assembly. A grease receiving port and cavity are provided in the sprocket or roller carrying assembly for receiving pressurized grease therein to force the sprocket or roller carrying assembly axially along the piston. A plurality of grease seals are provided between the sprocket or roller carrying assembly and the piston to ensure a fluid-tight interface therebetween and to prevent the infiltration of dirt into the cavity. A screw member is threadedly received within the hollow piston for axial travel into and out of the piston. A shaft member extends through the fixed end of the piston to be slidably and non-rotatably affixed to the screw member. By rotating the shaft, the screw member may be advanced into and out of the piston. A removable locking plate is provided to selectively restrict the rotation of the shaft member while the crawler is in operation.

To operate the mechanism, grease is pumped into the grease receiving port and cavity under pressure via a hand operated grease gun or other source of pressurized grease to thereby cause the sprocket or roller carrying assembly to slide along the piston causing the sprockets or rollers to be advanced into the endless chain. After the sprockets or rollers have been advanced into the chain a predetermined distance, the locking plate is then removed from engagement with the shaft to permit the shaft to be freely rotated. The shaft is then rotated until the screw contacts the bottom of the grease receiving cavity. The locking plate is then replaced to lock the shaft in a non-rotatable position while the machinery is being operated. Thereafter, the grease is permitted to escape back out of the grease receiving port and cavity by removing the source of pressurized grease.

Accordingly, the present invention provides solutions to the aforementioned problems encountered in the adjustment of crawler chains. This invention provides a mechanism through which very precise adjustments may be made to increase or decrease the relative distance between the idler and drive sprockets or rollers without the use of shim stock that may become lost and easily damaged during the operation of the chain or belt driven machinery. These and other details, objects and advantages of the invention will become apparent as the detailed description of the present invention proceeds.

BRIEF DESCRIPTION OF THE DRAWINGS

The preferred embodiment of the invention will now be described, by way of example only, with reference to the accompanying figures wherein like members bear like reference numerals and wherein.

DETAILED DESCRIPTION OF THE PREFERRED EMBODIMENT

Figure 2:
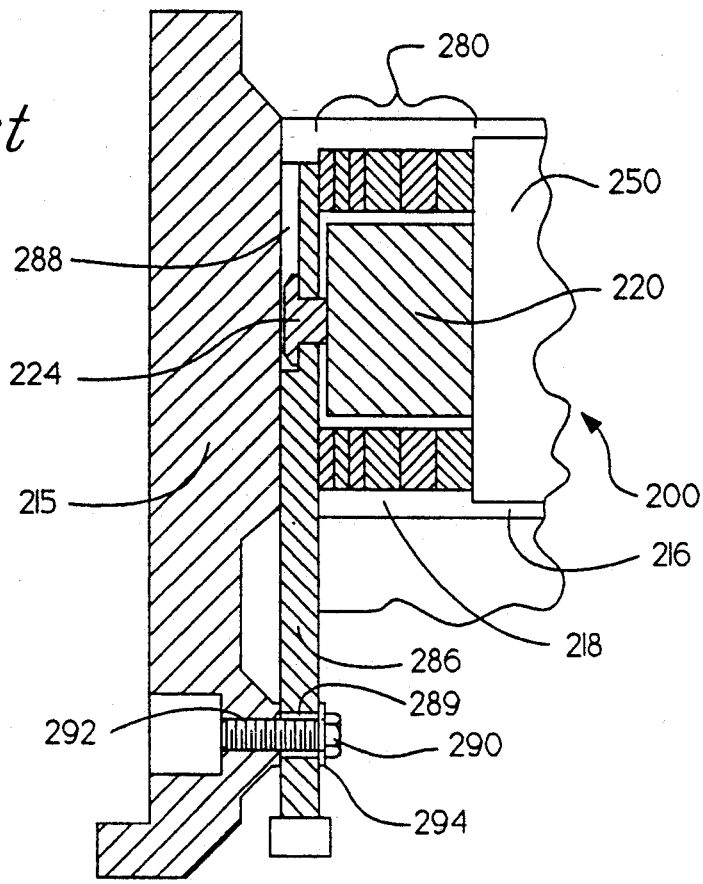
FIG. 2 is a partial section view of a prior chain take-up assembly taken along line II—II in FIG. 1.
Figure 1:
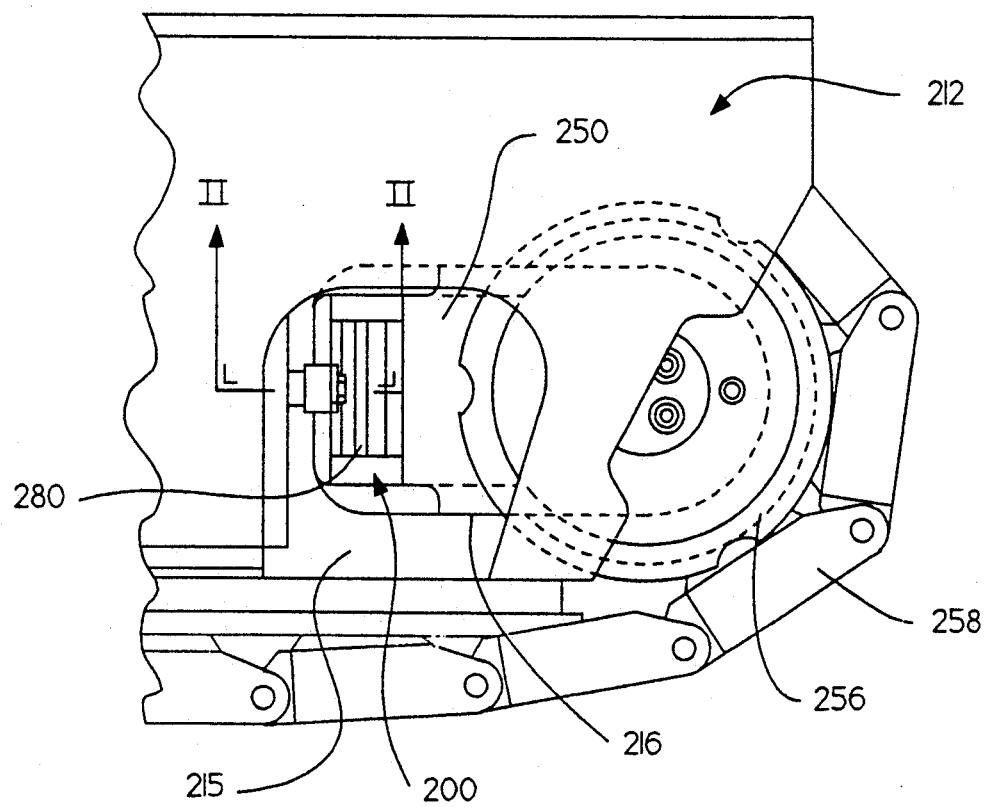
FIG. 1 is a partial side view of the crawler portion of a continuous mining machine showing a prior chain take up assembly.
Figure 3:
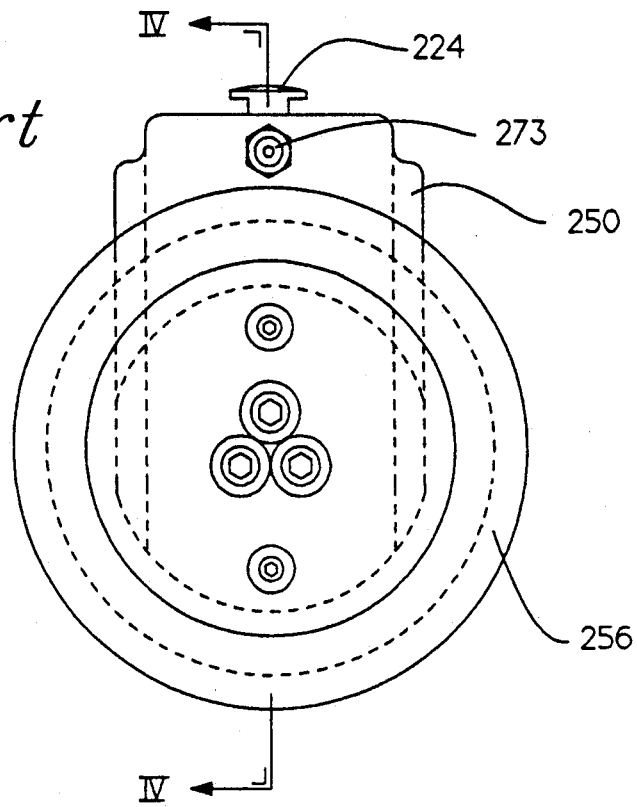
FIG. 3 is a side view of a prior chain take-up mechanism.
Figure 4:
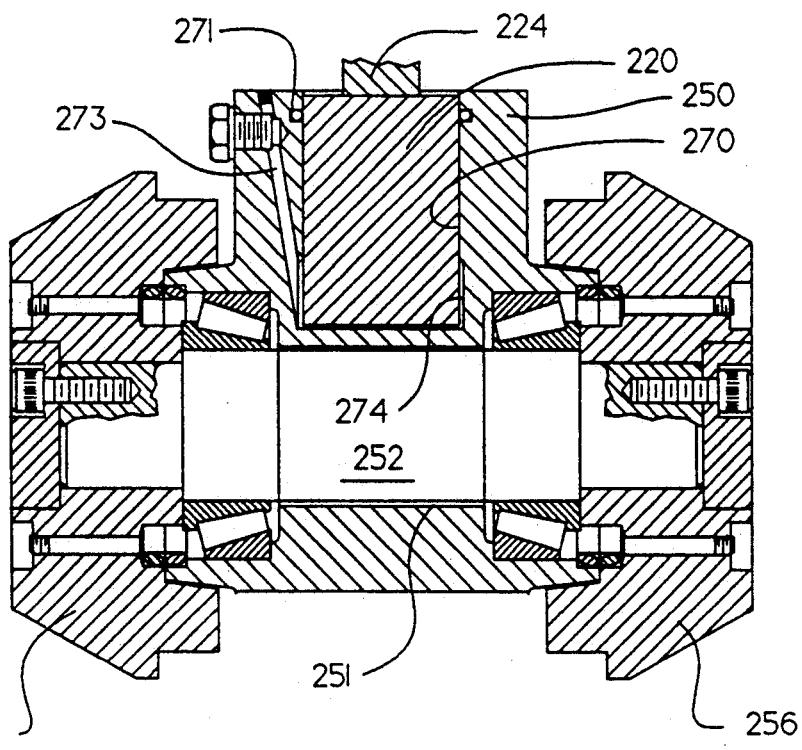
FIG. 4 is a cross-sectional view of a prior chain take-up mechanism taken along line IV—IV in FIG. 3.
Figure 5:
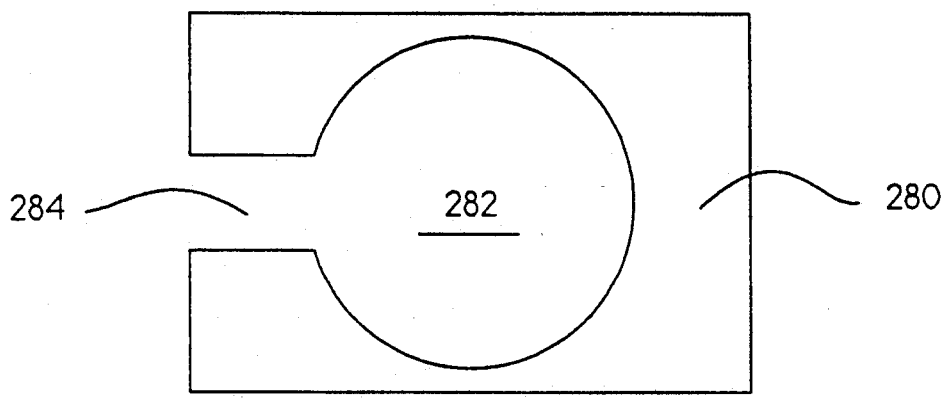
FIG. 5 is a side view of a shim stock used on a prior chain take-up mechanism.
Figure 6:
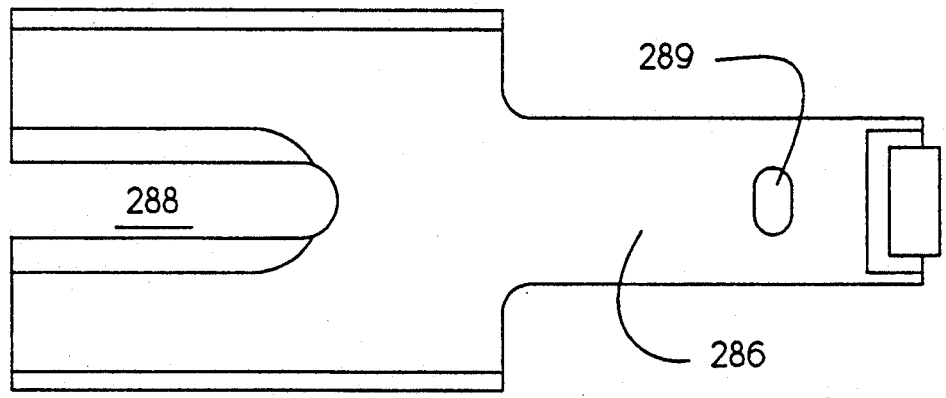
FIG. 6 is a side view of a shim retaining plate of a prior chain take-up mechanism.
Figure 7:
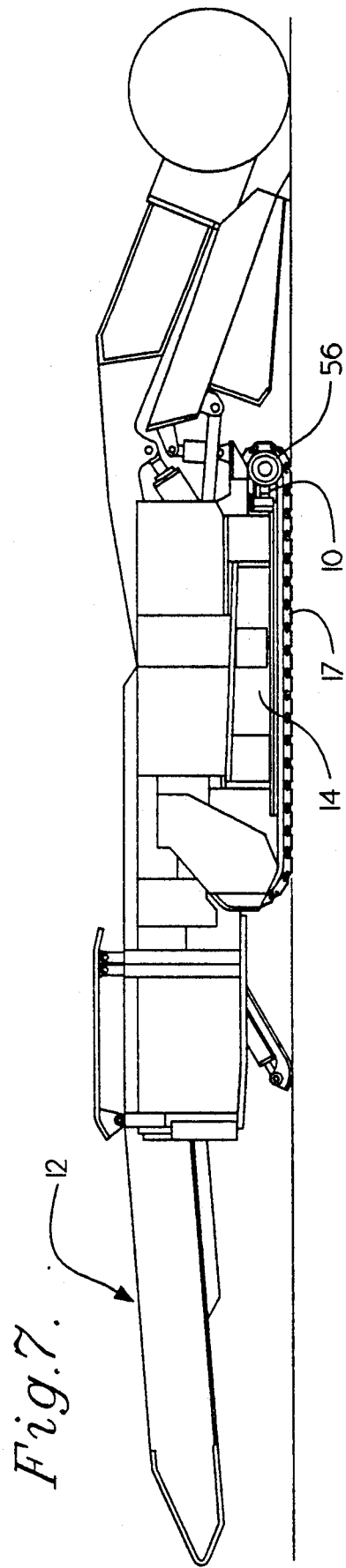
FIG. 7 is a side view of a continuous mining machine showing the location of the present invention.
Figure 8:
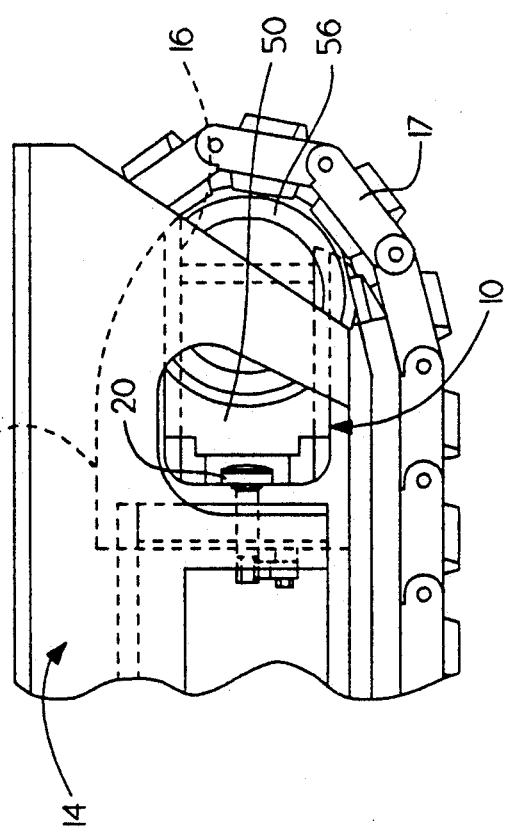
FIG. 8 is a partial side view of the crawler portion of a continuous mining machine showing the mounting arrangement of the invention.

Referring now to the drawings which are for purposes of illustrating the present preferred embodiment of the present invention only and not for purposes of limiting the same, the Figures show a chain take-up assembly generally designated as 10, constructed according to the teachings of the present invention. More particularly and with reference to FIGS. 7 and 8, there is shown a take-up mechanism 10 which may be used, for example, to adjust the position of idler sprockets 56 located on the crawler portion 14 of a mobile mining machine 12 in a direction parallel to the extent of the crawler chain 17. The take-up mechanism 10 consists of a piston 20 that is rigidly and non-rotatably mounted to the nose piece 15 of the crawler 14. In the preferred embodiment, the piston 20 is slidably received in a sprocket carrying assembly 50 that is operably received in a slot 16 located in the nose piece 15. It will be recognized by those of ordinary skill in the art, however, that while the Figures show a sprocket carrying device 50 for driving endless chains, the take-up mechanism 10 may easily be adapted for use with rollers or other forms of rotatable supports, for either driven or idlers, for a variety of endless elements such as endless belts and the like.

Figure 10:
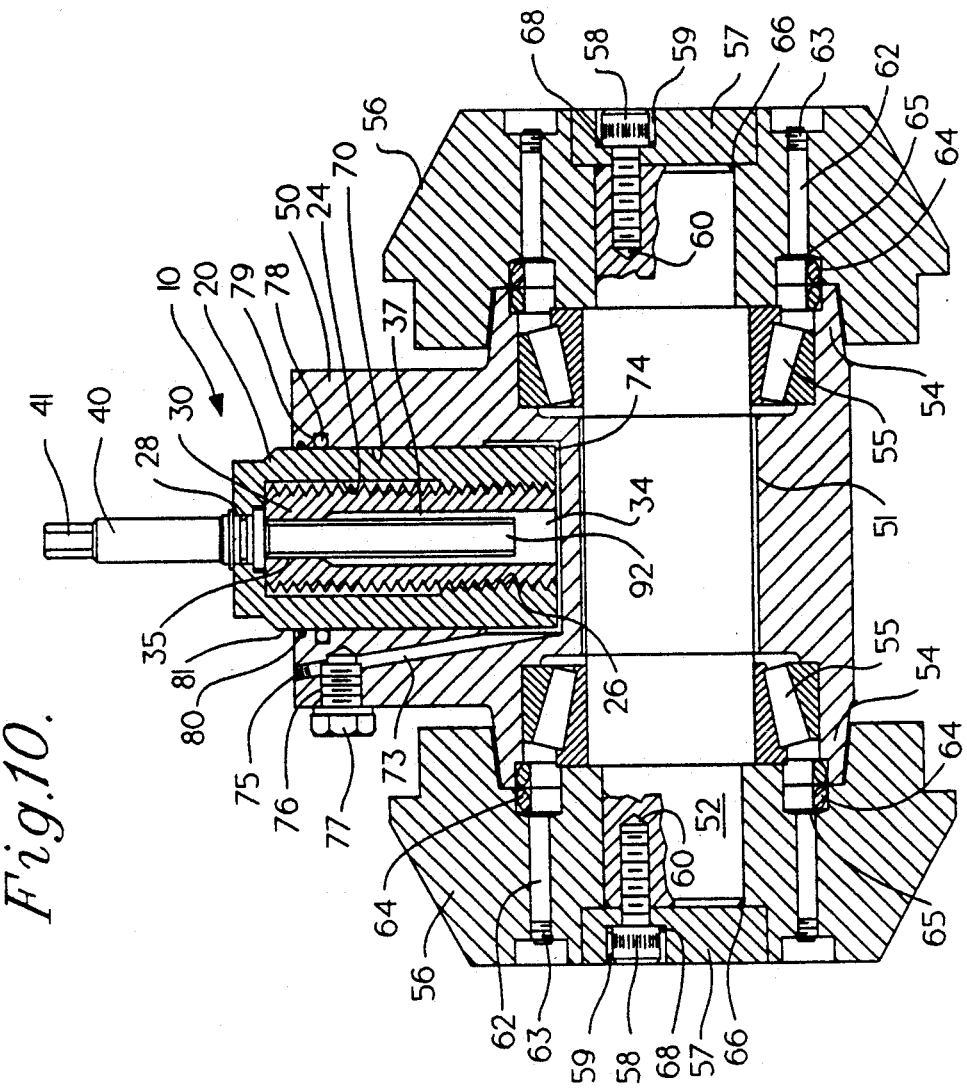
FIG. 10 is a cross-sectional view of the present invention taken along line X—X in FIG. 9.
Figure 9:
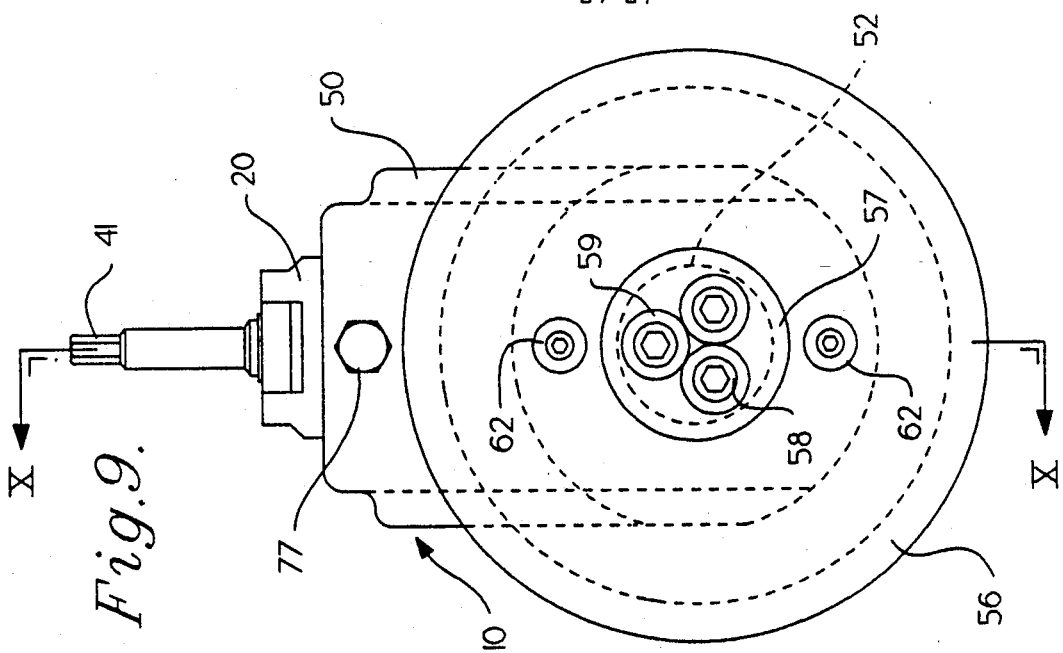
FIG. 9 is a side view of the present invention.
Figure 11:
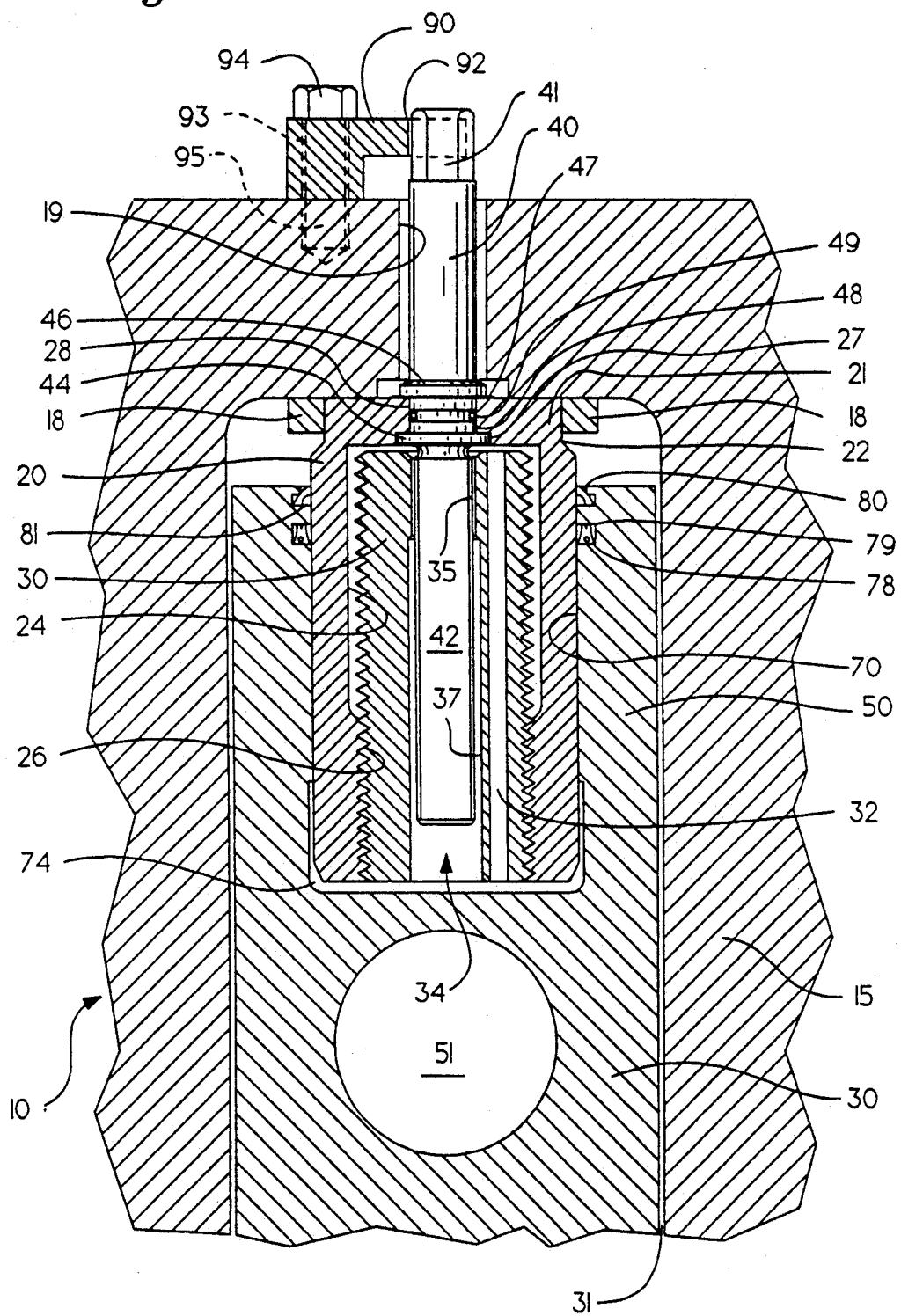
FIG. 11 is a partial sectional view of the present invention.

As shown in FIGS. 10 and 11, the sprocket or roller carrying assembly 50 has a cavity 70 therein that is adapted to receive the piston 20. A bore 51 extends through the sprocket carrying assembly 50 perpendicular to the cavity 70 and is adapted to rotatably receive an axle 52. Axle 52 is axially supported within the sprocket carrying assembly 50 by a pair of axle bearings 55 that are located in corresponding counterbored sleeves 54 that extend outward on each side of the sprocket carrying assembly 50.

As can be seen in FIG. 10, idler sprockets 56 are removably attached to each end of axle 52. While in the preferred embodiment, the idler sprockets 56 are adapted to engage a typical crawler chain 17 (see FIG. 8), it will be understood that the idler sprockets 56 may be adapted to engage any type of endless chain or belt. Idler sprockets 56 are preferably fastened to the axle 52 by hub members 57 and a plurality of socket head cap screws 58. Cap screws 58 extend through a plurality of corresponding counterbores 59 located in the hub members 57 and are received in corresponding threaded bores 60 located in each end of the axle 52. A plurality of grease passages 62, preferably 2 in number, are provided through each idler sprocket 56 to permit grease to be pumped into the axle bearings 55. Each grease passage 62 has a threaded portion 63 adapted to receive a threaded plug or grease fitting (not shown).

In addition, to prevent the intrusion of dirt into the axle bearings 55, various types of sealing means may be utilized. Preferably, grease seals 64 are provided in corresponding cavities 65 located in each sprocket 56 to prevent dirt from entering into the axle bearings 55 through the interface between the sprocket carrying assembly 50 and the sprockets 56. O-rings 66 are also preferably provided at each end of axle 52 to create a grease-tight seal between the hubs 57 and the axle 52. In addition, round wire split rings 68, also known as "hog" rings, are provided in counterbores 59 to prevent loosening of the cap screws 58.

The piston 20 is positioned perpendicularly with respect to axle 52 within the cavity 70 located in the sprocket carrying assembly 50. As shown in FIG. 10, a grease passage 73 extends through the side of the sprocket carrying assembly 50 into the cavity 70 to enable grease to be pumped into a grease receiving area 74 located at the bottom of the cavity 70. The grease passage 73 has an upper threaded portion 75 that is adapted to receive a plug or a typical grease fitting (not shown). An additional threaded port 76 is preferably provided through the side of the sprocket carrying assembly 50 to enable the grease passage 73 to be easily accessed from the side of the crawler 14. A plug 77, preferably a special hex head cap screw having a grease fitting therein, is threaded into the port 76 to release the grease pressure after the adjustment has been completed. A grease seal 78 is also provided in an annular groove 79 located in the cavity 70 to prevent grease from escaping between the piston 20 and the sprocket carrying assembly 50 as it is pumped into the grease receiving area 74. In addition, a wiper seal 80 is preferably provided in an annular groove 81 located in the open end of the cavity 70 to prevent dirt from entering into the cavity 70 as the sprocket carrying assembly 50 slides along the piston 20.

The piston 20 has a circular cross-section and is adapted to be slidably received in the cavity 70 located in the sprocket carrying assembly 50. As most particularly shown in FIG. 11, the piston 20 is somewhat longer than the cavity 70 is deep to thereby permit an upper portion 21 thereof to protrude out of cavity 70. The upper portion 21 of the piston 20 preferably has at least two flat surfaces 22 thereon that are adapted to be received between corresponding key members 18 located on the inside of the nose piece 15. The key members 18 are preferably welded to the nose piece 15 to prevent the piston 20 from rotating within the cavity 70. However, it will be recognized that the key members 18 may be rigidly attached to the nose piece 15 by any known fastening means.

The piston 20 has an axial counterbore 24 centrally disposed therein that has a threaded lower portion 26. As can be seen in FIGS. 10 and 11, a threaded screw member 30 is received within the piston 20 and is adapted to engage the threaded portion 26 for axial travel therein. The screw member 30 has an axial bore 34 therethrough that has a squared upper portion 35 and a circular lower portion 37. To aid in the rotation of screw member 30 within piston 20, a second axial bore 32 (see FIG. 11) is preferably provided through the screw member 30 to permit grease to pass out of the grease receiving area 74 and into the non-threaded portion of the counterbore 24 to thereby keep the threads on screw member 30 constantly lubricated with grease.

As further shown in FIG. 11, a bore 19 is provided through the end of the nose piece 15 to substantially correspond with an axial bore 28 located in the piston 20. A shaft member 40, having a squared lower portion 42 is slidably received in the square bore 35 located in one end of the screw member 30. It will be understood that the bores 19 and 28 are of sufficient diameter so as to permit the shaft member 40 to be freely rotated therein.

In the preferred embodiment, the shaft member 40 is rotatably fastened to piston 20 by collars 44 and 46 located on shaft 40. In particular, the collar 44 is rotatably received in an axial counterbore 27 located in the upper portion 21 of the piston 20. The collar 44 limits the axial movement of the shaft 40 in a direction away from the axle 52. Conversely, the collar 46, acting in concert with a spring clip 47, prevents the axial movement of the shaft member 40 in a direction toward axle 52. In addition, a radial groove 48 is provided in shaft member 40 for receiving a grease seal 49. The grease seal 49 prevents grease and dirt from passing between the shaft member 40 and the piston 20.

In the preferred embodiment, the shaft member 40 protrudes a short distance out of the nose piece 15 so that it may be accessed with a wrench. The end of the shaft member 40 preferably has wrench flats 41 machined thereon to accommodate the use of a wrench or socket during the adjustment process.

Figure 12:
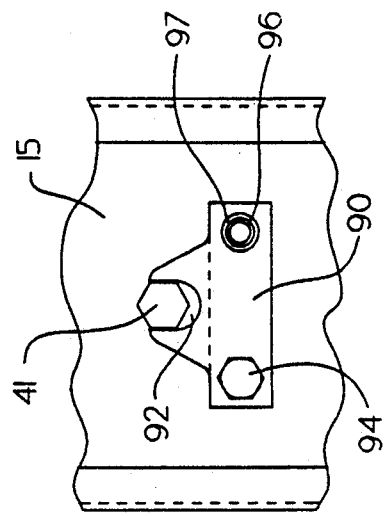
FIG. 12 is an end view of the lock plate assembly of the present invention.

To prevent the shaft member 40 from rotating within the piston 20 during the operation of the crawler 14, a lock plate 90, having a shaft receiving cradle 92 therein, is removably attached to the end of the nose piece 15. The lock plate 90 is removably attached to the end of the nose piece 15 preferably by a cap screw 94 and a spring pin 96 (see FIGS. 11 and 12). In this arrangement, the cap screw 94 extends through a bore 93 located in one side of the locking plate 90 and is threadedly received in a corresponding threaded bore 95 located in the nose piece 15. The spring pin 96 is rigidly fastened to the nose piece 15 and is slidably received in a sleeve 97 located in the lock plate 90. This method of attachment permits the locking plate 90 to be swung out of position while remaining attached to the nose piece 15 so that it does not become lost or misplaced during the adjustment process. It will be recognized by those of ordinary skill in the art, however, that the lock plate 90 may be removably attached to the nose piece 15 by a number of known fastening means.

The take-up mechanism 10 of the present invention is easily adjusted by first pumping grease into the grease receiving area 74 through the grease passage 73. This may be accomplished by a variety of known grease pumping mechanisms that are adapted to pump grease under pressure. As the grease is pumped into the grease receiving area 74, the sprocket carrying assembly 50 is forced to slide forward on the piston 20. Grease is added in this manner until the sprocket carrying assembly 50 has moved far enough forward to remove the slack out of the crawler chain 17. The grease pressure is then relieved by removing the source of pressurized grease from the grease passage 73 and loosening the screw 77 to thereby permit the grease to flow out of the grease passage 73 and grease receiving cavity 74. The lock plate 90 is then removed to permit the free rotation of the shaft member 40. The shaft member 40, is then rotated to advance the screw member 30 into the cavity 70. The grease located in the axial bore 34 of the screw member 30 enables the screw member 30 to freely slide along the square portion 42 of the shaft member 40 as it is rotatably advanced into the cavity 70. The shaft member 40 is rotated in this manner until the screw member 30 contacts the bottom of the cavity 70. The lock plate 90 is then reinstalled to prevent the screw 30 from backing out of the cavity 70. It will be understood that, when in the above-described position, the screw member 30 serves as a positive mechanical stop for holding the sprocket carrying assembly 50 in the desired position.

The present invention as described hereinabove addresses the various problems encountered when using prior take-up devices. However, it will be appreciated that various changes in the details, materials and arrangements of parts which have herein been described and illustrated in order to explain the nature of the invention, may be made by those skilled in the art within the principle and scope of the invention as expressed in the appended claims.

What is claimed is:

1. Apparatus for adjusting the operative position of a rotatable support for an endless driven element, said rotatable support being mounted on a frame for movement in a first direction, comprising:
   a piston member non-rotatably attached to said frame;
   a carrying member operably attached to said rotatable support, said carrying member defining a cylinder adapted to slidably receive said piston in fluid sealing relationship therein;
   a screw member rotatably received within said piston member;
   means for axially advancing said carrying member on said piston in said first direction to a predetermined position;
   means for advancing said screw member relative to said piston member to contact said carrying member when said carrying member is in said predetermined position; and
   means for locking said screw member in position after contacting said carrying member in said predetermined position to thereby mechanically retain said carrying member in said predetermined position.

2. The apparatus of claim 1 wherein said means for axially advancing said carrying member on said piston comprises means for receiving a pressurized fluid between said piston and said cylinder to cause said carrying member to axially advance on said piston member to said predetermined position.

3. The apparatus of claim 2 wherein said means for advancing said screw member comprises a shaft member operably and rotatably fastened to said piston member for communication with said screw member so that by rotating said shaft member, said screw member may be advanced into and out of said piston member.

4. The apparatus of claim 3 wherein said shaft member is slidably and non-rotatably fastened to said screw member.

5. The apparatus of claim 4 wherein said means for locking said screw member comprises a means for selectively restricting the rotational movement of said shaft member.

6. The apparatus of claim 5 wherein said rotation restricting means comprises a locking member removably fastened to the frame and having a cradle therein adapted to receive and non-rotatably retain said shaft therein.

7. The apparatus of claim 6 wherein said endless element is a chain and said rotatable support comprises a chain engaging sprocket.

8. An apparatus for adjusting the operative position of a chain engaging sprocket for removing the slack from an endless driven chain, said chain engaging sprocket being mounted on a frame for movement in a first direction, comprising:
   a piston member non-rotatably attached to said frame;
   a sprocket carrying member operably attached to said chain engaging sprocket, said sprocket carrying member defining a cylinder adapted to slidably receive said piston in fluid sealing relationship therein for axial travel along said piston and having a pressure fluid receiving port and cavity therein adapted to receive a pressurized fluid between said piston and said cylinder;

sealing means for providing a fluid-tight seal between said piston and said sprocket carrying member so that a pressurized fluid may be entered into said pressure fluid port and cavity to axially advance said sprocket carrying member along said piston in said first direction to a position in which the slack is eliminated;

a screw member rotatably affixed within said piston member;

a shaft member rotatably affixed to said piston member and extending therethrough to be slidably and non-rotatably received by said screw member so that when said shaft is rotated said screw member may be advanced into or out of said sprocket carrying member to mechanically retain said sprocket carrying member in said predetermined position; and a locking mechanism having a shaft receiving cradle therein adapted to receive and restrict the rotation of said shaft member, said locking mechanism being removably attached to said frame.

* * * * *